US009582341B2

(12) United States Patent
Lee et al.

(10) Patent No.: US 9,582,341 B2
(45) Date of Patent: Feb. 28, 2017

(54) SEMICONDUCTOR DEVICE INCLUDING A PLURALITY OF PROCESSORS AND A METHOD OF OPERATING THE SAME

(71) Applicant: SK hynix Inc., Gyeonggi-do (KR)

(72) Inventors: Joung Young Lee, Gyeonggi-do (KR); Duk Rae Lee, Gyeonggi-do (KR); Dong Jae Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 85 days.

(21) Appl. No.: 14/515,232

(22) Filed: Oct. 15, 2014

(65) Prior Publication Data
US 2015/0324243 A1   Nov. 12, 2015

(30) Foreign Application Priority Data

May 7, 2014   (KR) .......................... 10-2014-0054205

(51) Int. Cl.
| | |
|---|---|
| G06F 3/00 | (2006.01) |
| G06F 9/46 | (2006.01) |
| G06F 9/54 | (2006.01) |
| G06F 13/00 | (2006.01) |
| G06F 9/48 | (2006.01) |

(52) U.S. Cl.
CPC ............. *G06F 9/544* (2013.01); *G06F 9/4881* (2013.01); *G06F 9/54* (2013.01); *G06F 13/00* (2013.01)

(58) Field of Classification Search
CPC ........... G06F 9/546; G06F 9/54; G06F 9/4881
USPC ................................. 719/313, 310; 718/106
See application file for complete search history.

(56) References Cited

U.S. PATENT DOCUMENTS

| | | | |
|---|---|---|---|
| 5,155,858 A * | 10/1992 | DeBruler ................ | G06F 9/505 712/30 |
| 6,226,695 B1 | 5/2001 | Kaiser et al. | |
| 6,553,480 B1 * | 4/2003 | Cheong ................. | G06F 9/3836 712/23 |
| 6,880,066 B2 | 4/2005 | Suetake | |
| 2004/0143738 A1 * | 7/2004 | Savage ................ | G06Q 20/383 713/168 |
| 2009/0168525 A1 * | 7/2009 | Olbrich ............... | G06F 13/1657 365/185.11 |
| 2013/0179614 A1 * | 7/2013 | Ross ...................... | G06F 13/385 710/264 |
| 2014/0122760 A1 * | 5/2014 | Grisenthwaite ......... | G06F 13/26 710/265 |

FOREIGN PATENT DOCUMENTS

KR   1020090077822   7/2009

OTHER PUBLICATIONS

Frederick M. Proctor, Canonical Machinning Commands, Jan. 30, 1997.*

* cited by examiner

*Primary Examiner* — Lechi Truong
(74) *Attorney, Agent, or Firm* — IP & T Group LLP

(57) ABSTRACT

A semiconductor device may include a first processor transferring a plurality of command data sets, a mailbox receiving and storing the plurality of command data sets, and a second processor receiving command data sets of the mailbox, wherein the first processor may transfer at least one abort slot number to the mailbox, and wherein the mailbox may search and abort a command data set having a slot number which is identical to an abort slot number among the plurality of command data sets.

15 Claims, 10 Drawing Sheets

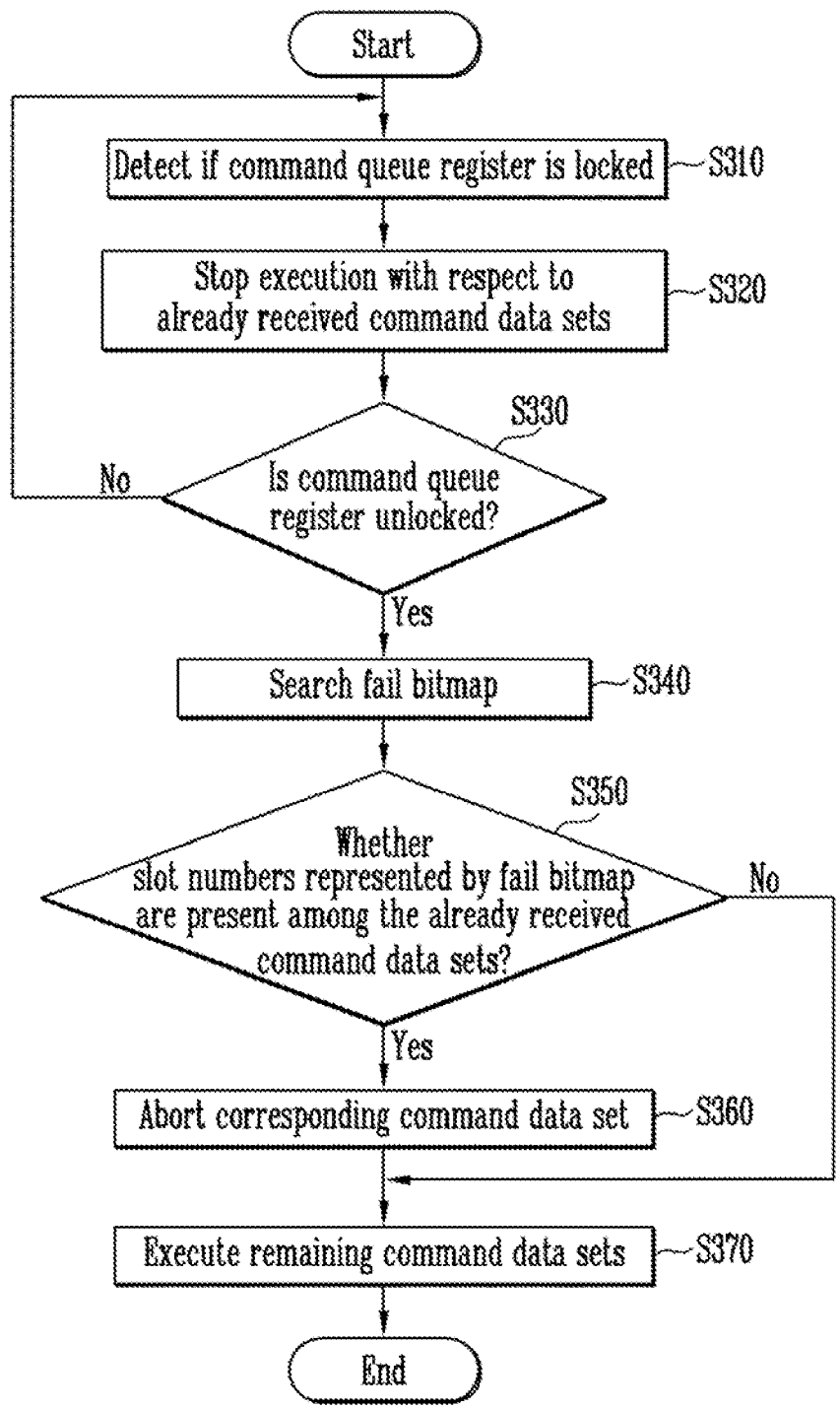

SEMICONDUCTOR DEVICE INCLUDING A PLURALITY OF PROCESSORS AND A METHOD OF OPERATING THE SAME

CROSS-REFERENCE TO RELATED APPLICATION

The present application claims priority to Korean Patent Application Number 10-2014-0054205, filed on May 7, 2014, the entire disclosure of which is herein incorporated in its entirety by reference.

BACKGROUND

Field of Invention

Various exemplary embodiments relate generally to an electronic device, and more particularly, to a semiconductor device including plurality of processors and a method of operating the same.

Description of Related Art

In portable electronic devices such as portable multimedia players, mobile phones, smart phones, GPS navigation devices, digital cameras, digital video cameras, personal digital assistants, etc., a multi-processor system which employs a plurality of processors in a single system to perform various functions in a smooth manner and perform each function at a high speed is preferred. Since each processor can control at least one function block within a system, the function blocks within the system can operate more effectively in accordance with control of two or more processors.

A mobile phone, for example, may be implemented to have, in addition to its basic phone functions, music player functions, video player functions, communication functions with wireless Internet, payment functions, game functions, camera functions, etc. Thus, there is a need to employ both a communications processor for performing communication modulation and demodulation functions and a processor for performing functions other than the communication functions in a mobile phone. Furthermore, a plurality of processors can be employed in a controller for a storage medium within the system. The plurality of processors employed as such enable the controllers to work at high speeds.

SUMMARY

Various exemplary embodiments are directed to a semiconductor device including a plurality of processors and a method of operating the same.

An embodiment may provide a semiconductor device including a first processor transferring a plurality of command data sets, each of the command data sets including a command and a slot number corresponding to the command, a mailbox receiving the plurality of command data sets and aborting some of the plurality of command data sets according to control of the first processor, and a second processor receiving command data sets of the mailbox. When aborting, the first processor may transfer at least one abort slot number to the mailbox. The mailbox may search and abort the command data set having the slot number that is identical to the at least one abort slot number among the plurality of command data sets.

In an embodiment, the slot number included in each of the plurality of command data sets may be one of a plurality of predetermined slot numbers. The first processor may transfer the at least one abort slot number by providing an abort bitmap to the mail box. The abort bitmap may include data bits. Each of the data bits may correspond to the plurality of predetermined slot numbers.

In an embodiment, the data bit corresponding to the at least one abort slot number among the data bits of the abort bitmap may have a select value, and remaining data bits may have non-select values.

In an embodiment, the mailbox may search and abort the command data set having the slot number which corresponds to the data bit of the select value among the data bits of the abort bitmap.

In an embodiment, the mailbox may include a command queue register storing the plurality of command data sets. The first processor may transfer a command lock signal to the mailbox and the mailbox may block input/output with respect to the command queue register in response to the command lock signal.

In an embodiment, the mailbox may allow input/output with respect to the command queue register upon completion of the search and abort.

In an embodiment, the mailbox may include the command queue register which stores the plurality of command data sets and a command management register. A fail slot number which does not exist among the slot numbers of the plurality of command data sets exists among the at least one abort slot number and may be stored in the command management register.

In an embodiment, the slot number included in each of the plurality of command data sets may be one of a plurality of predetermined slot numbers. The mailbox may store a fail bitmap including data bits respectively corresponding to the plurality of predetermined slot numbers in the command management register. The fail slot number may be specified according to the fail bitmap.

In an embodiment, the data bit corresponding to the fail slot number among the data bits of the fail bitmap may have the select value, and the remaining data bits may have the non-select values.

In an embodiment, the second processor may temporarily store the command data sets received from the mailbox. The second processor may determine whether the temporarily stored slot numbers of the command data sets equal the fail slot number by searching the command management register.

In an embodiment, the second processor may abort the command data set having the slot number which equals the fail slot number among the temporarily stored command data sets and execute commands of the remaining command data sets.

An embodiment may provide a method for operating a semiconductor device including a plurality of processors. The method may include storing a plurality of command data sets generated by a first processor among the plurality of processors in a mailbox, wherein each of the plurality of command data sets may include a command and a slot number corresponding to the command, transferring at least one abort slot number from the first processor to the mailbox, aborting a command data set having a slot number equal to the at least one abort slot number among the plurality of command data sets stored in the mailbox, and transferring the command data sets stored in the mailbox to a second processor among the plurality of processors.

In an embodiment, the slot number included in each of the plurality of command data sets may be one of a plurality of predetermined slot numbers. The transferring of the at least one abort slot number may provide an abort bitmap which may include data bits respectively corresponding to the plurality of predetermined slot numbers to the mailbox to transfer the at least one abort slot number.

In an embodiment, the operating method may further include storing in the mailbox a fail slot number which is not found in the slot numbers of the plurality of command data sets but exists among the abort slot number, and determining whether the slot numbers of the command data sets transferred from the mailbox are identical to the fail slot number by searching the fail slot number stored in the mailbox.

In an embodiment, the command data set having the slot number which is equal to the fail slot number among the temporarily stored command data sets may be aborted, and the second processor may execute commands of the remaining command data sets.

An embodiment may provide a semiconductor device comprising a mailbox. The mailbox may include a command queue register storing first command data sets, a controller locating a second command data set among the first command data sets using abort information, aborting the second command data set, if any, and creating third command data sets by replacing the second command data set of the first command data sets with a default value, and an output unit outputting the third command data sets.

In an embodiment, each of the first command data sets may include a command and a slot number, the abort information may include an abort slot number, and the second command data set may include a slot number corresponding to the abort slot number.

In an embodiment, the abort information may include N bits to which slot numbers '0' through 'N-1' (N is an integer) are respectively assigned, a given bit of the N bits may have a first binary number when the slot number assigned to the given bit is designated as the abort slot number and has a second binary number opposite to the first binary number when the slot number assigned to the given bit is not designated as the abort slot number, and the slot number included in each of the first command data sets may be selected from the slot numbers '0' through 'N-1'.

In an embodiment, the abort information may designate a slot number M as the abort slot number (M is an integer selected between '0' through 'N-1'), and the mailbox may locate a command data set including the slot number M as the second command data set.

In an embodiment, the 'M+1'th bit of the N bits may have the first binary number and each of the remaining bits may have the second binary number.

In an embodiment, the N bits may be configured as a bitmap, and the mailbox may further comprise a first command management register storing the bit map.

In an embodiment, the mailbox may further include a lock register receiving a command lock signal, and the controller may block the first command data sets from outputting through the output unit in response to the command lock signal.

In an embodiment, the semiconductor device may further comprise a first processor providing the abort information to the mailbox, and a second processes receiving and executing the third command data sets, the second processor may not execute the default value replacing the second command data set.

In an embodiment, the controller may further create a fail bitmap, the fail bitmap may include. N bits to which the slot numbers '0' through 'N-1' are respectively assigned, a given bit of the N bits may have a first binary number when the slot number assigned to the given bit is designated as a fail slot number and have a second binary number opposite to the first binary number when the slot number assigned to the given bit is not designated as the fail slot number, and a slot number which is found in the abort information but not located in the first command data sets may be designated as the fail slot number.

In an embodiment, the semiconductor device may further comprise a first processor providing the abort information to the mailbox, and a second processor receiving the third command data sets and the fail bitmap from the mailbox, locating a fourth command data set among the third command data sets using the fail bitmap, aborting the fourth command data set, if any, and executing the third command data sets excluding the fourth command data set aborted, the fourth command data set may have a slot number corresponding to the fail slot number.

The foregoing summary is illustrative only and is not intended to be limiting in any way. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages will become more apparent with reference to the attached drawings in which:

FIG. 12 is a flow chart illustrating an operating method of a second processor.

DETAILED DESCRIPTION

Figure 1:
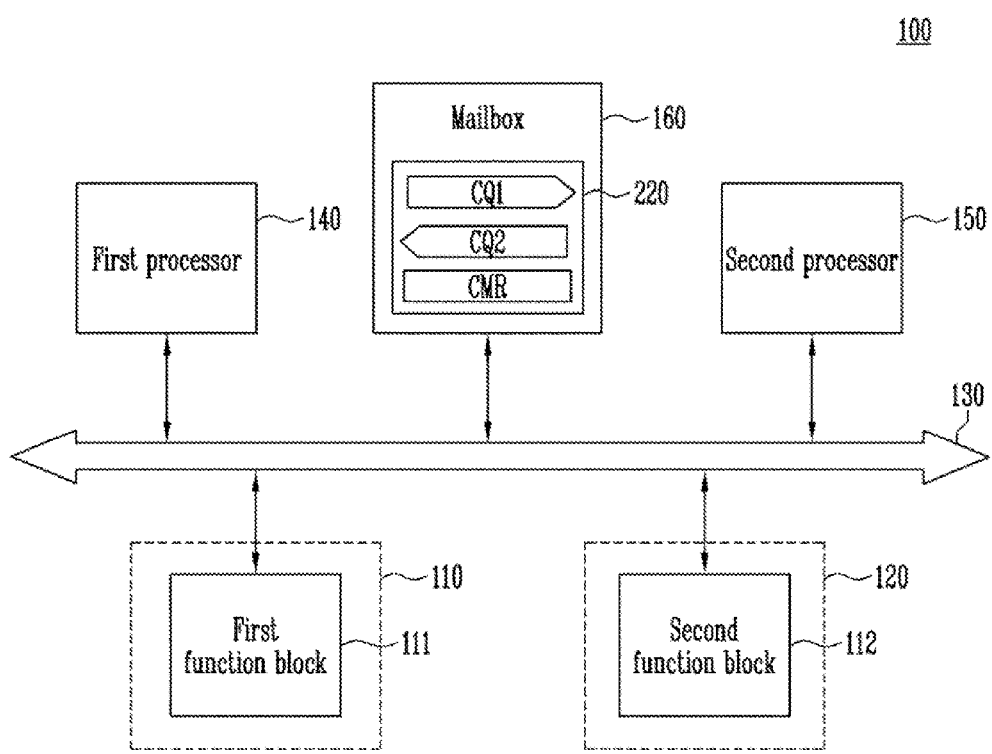
FIG. 1 is a block diagram illustrating a semiconductor device according to an embodiment.

Hereinafter, preferable embodiments will be described. In the drawings, thicknesses and lengths of elements may be exaggerated for convenience of illustration. In describing the embodiments, configurations, structures, and methods that are commonly known to those skilled in the art may be omitted for simplicity of explanation. Throughout the drawings, like reference numerals refer to like elements.

FIG. 1 is a block diagram illustrating a semiconductor device 100 according to an embodiment.

The semiconductor device 100 may include a plurality of function block groups 110 and 120, a bus 130, first and second processors 140 and 150 and a mailbox 160.

The first and second function block groups 110 and 120 may be coupled to the bus 130. Each of the function block groups may include at least one function block. The first function block group 110 may include a first function block 111. The second function block group 120 may include a second function block 112. Each function block may perform a certain function.

In an embodiment, each of the first and second function blocks 111 and 112 may include an interface (not shown) communicating with the bus 130. Each of the first and second function blocks 111 and 112 may communicate with the bus 130 using the applicable interface.

In FIG. 1, the semiconductor device 100 is shown to include two function blocks 111 and 112. However, this is for illustrative purposes only. Since each function block group may include two or more function blocks, the semiconductor device 100 may include more function blocks than what is shown in FIG. 1.

The first function block 111 included in the first function block group 110 may operate according to control of the first processor 140 via the bus 130. For example, when the first function block 111 performs interfacing functions between an external host (not shown) and the semiconductor device 100, the first function block 111 may receive a request (for example, a write request, a read request, etc.) from the external host in response to control of the first processor 140. The first function block 111 may transfer a response generated in response to control of the first processor 140 to the external host.

The second function block 112 included in the second function block group 120 may operate according to control of the second processor 150 via the bus 130. For example, the second function block 112 may perform interfacing functions between a nonvolatile memory device (not shown) and the semiconductor device 100. The second function block 112 may write data to the nonvolatile memory device and read the data from the nonvolatile memory device in response to control of the second processor 150.

The first and second processors 140 and 150 may communicate with each other through the mailbox 160. The first processor 140 may be electrically connected to the bus 130. The first processor 140 may control the first function block 111 of the first function block group 110 through the bus 130. The first processor 140 may communicate with the mailbox 160 via the bus 130. The second processor 150 may be coupled to the bus 130. The second processor 150 may control the second function block 112 of the second function block group 120 through the bus 130. The second processor 150 may communicate with the mailbox 160 via the bus 130.

In an embodiment, each of the first and second processors 140 and 150 may be coupled to a separate memory (not shown) which stores firmware and may operate according to the firmware stored in the corresponding memory.

In an embodiment, the first and second processors 140 and 150 may communicate with each other via the mailbox 160. When the first processor 140 transfers a command that the second processor 150 will process, the first processor 140 may generate a command data set including the command. The first processor 140 may transfer the generated command data set to the mailbox 160. The command data set provided to the mailbox 160 may be provided to the second processor 150.

Each command data set may include a command and a slot number. For example, based on a request received from the external host (not shown) through the first function block 111, the first processor 140 may generate a command to be transferred to the second processor 150 and may assign a predetermined slot number to the generated command. The slot number may be one of a plurality of predetermined slot numbers. The first processor 140 may select one of the plurality of slot numbers and assign the selected slot number to the command. The first processor 140 may generate a command data set including a command and a corresponding slot number.

In reverse, the second processor 150 may transfer a command data set including a command to the mailbox 160 when the second processor 150 transfers the command that the first processor 140 will process. The command data set provided from the second processor 150 to the mailbox 160 may be transferred to the first processor 140.

The mailbox 160 may include a register group 220. The register group 220 may include first and second command queue registers CQ1 and CQ2 and a command management register CMR.

The command data sets received from the first processor 140 may be stored sequentially in the first command queue register CQ1. The command data sets stored in the first command queue register CQ1 may be output sequentially to the second processor 150. The command data sets received from the second processor 150 may be stored sequentially in the second command queue register CQ2. The command data sets stored in the second command queue register CQ2 may be output sequentially to the first processor 140.

Each of the first and second command queue registers CQ1 and CQ2 may store and output the command data sets in a first-in-first-out (FIFO) method.

The mailbox 160 may further include the command management register CMR corresponding to one of the first and second command queue registers CQ1 and CQ2.

For convenience of illustration, the following description will focus on the command data sets transferred to the second processor 150 from the first processor 140 via the mailbox 160. And it will be assumed that the command management register CMR corresponds to the first command queue register CQ1. However, this is for illustrative purposes only, and additional command management registers corresponding to the second command queue register CQ2 may be further provided in the mailbox 160.

In an embodiment, the command management register CMR may store abort slot numbers transferred from the first processor 140. The first processor 140 may transfer the abort slot numbers to abort some of the command data sets (i.e., the command data sets stored in CQ1) already transferred to the mailbox 160.

The mailbox 160 may abort some of the command data sets stored in the first command queue register CQ1 according to the abort slot numbers stored in the command management register CMR. Among the command data sets stored in the first command queue register CQ1, a command data set having the slot number identical to the abort slot number may be aborted.

The first processor 140 may abort all or some of the command data sets already transferred to the mailbox 160. The command which the second processor 150 does not need to execute may be aborted in the mailbox 160, and the command may not be executed by the second processor 150. As unnecessary commands are not executed, reliability of the semiconductor device 100 may be improved, and the operating speed of the semiconductor device 100 may be enhanced.

Figure 2:
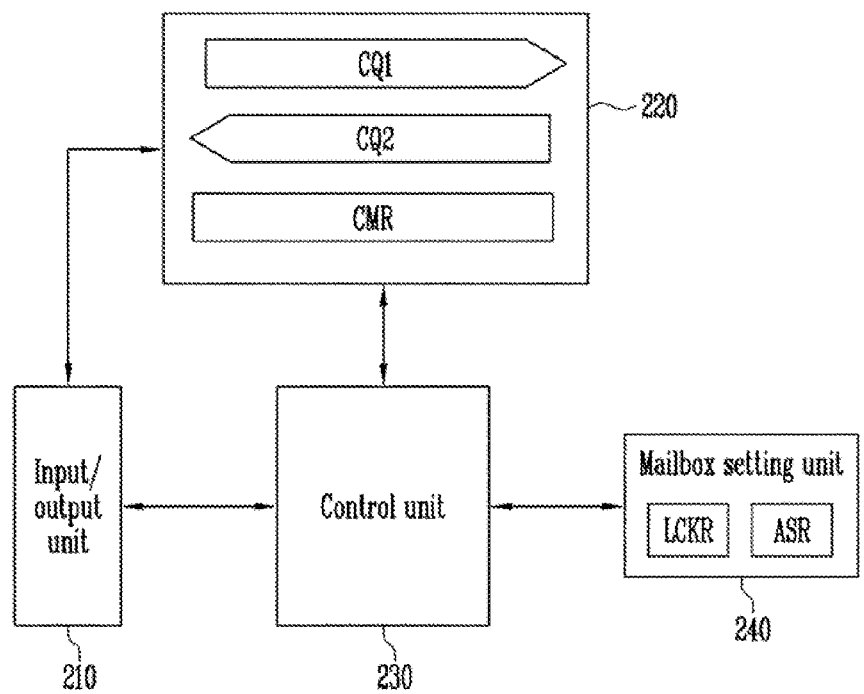
FIG. 2 is a block diagram illustrating a mailbox.
Figure 3:
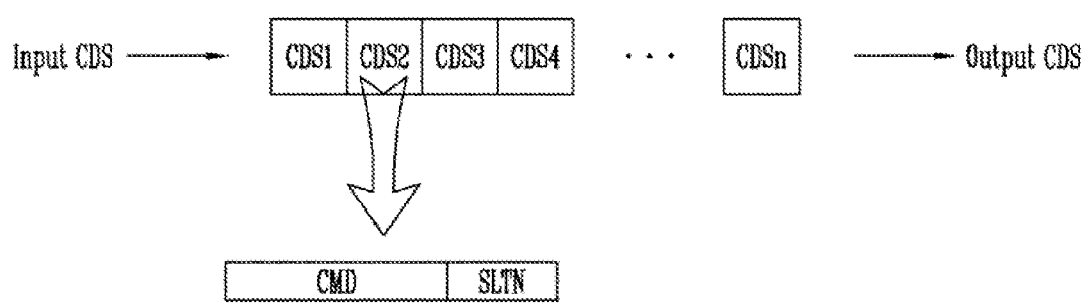
FIG. 3 is a conceptual diagram illustrating a command data set stored in one of command queue registers.
Figure 4:
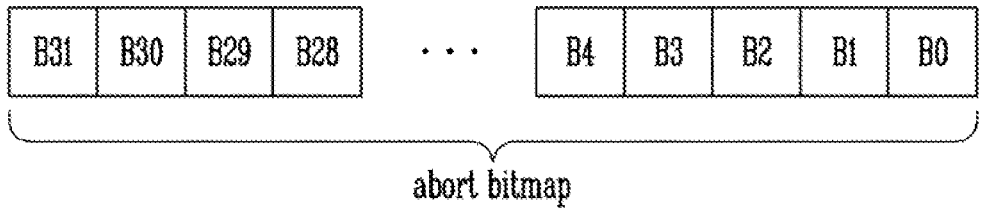
FIG. 4 is a conceptual diagram illustrating an abort bitmap stored in the command management register shown in FIG. 2.

FIG. 2 is a block diagram further illustrating the mailbox 160 shown in FIG. 1. FIG. 3 is a conceptual diagram illustrating command data sets CDS1 to CDSn stored in a first command queue register CQ1 of the command queue registers CQ1 and CQ2 shown in FIG. 2. FIG. 4 is a conceptual diagram illustrating an abort bitmap stored in the command management register CMR shown in FIG. 2.

Referring to FIGS. 1 and 2, the mailbox 160 may include an input/output unit 210, the register group 220, a control unit 230 and a mailbox setting unit 240.

The input/output unit 210 may be coupled to the bus 130. The input/output unit 210 may operate in response to control of the control unit 230. The input/output unit 210 may receive the command data sets from the first and second processors 140 and 150. The input/output unit 210 may store the command data sets received from the first processor 140 in the first command queue register CQ1. The input/output unit 210 may store the command data sets received from the second processor 150 in the second command queue register CQ2.

The input/output unit 210 may output command data sets to the first and second processors 140 and 150. The input/output unit 210 may output the command data sets stored in the first command queue register CQ1 to the second processor 150. The input/output unit 210 may output the command data sets stored in the second command queue register CQ2 to the first processor 140.

Referring to FIG. 3, the command queue register CQ1 may store first to nth command data sets CDS1 to CDSn. The first to nth command data sets CDS1 to CDSn may be input to the command queue register CQ1 and output from the command queue register CQ1 according to the FIFO method.

Each of the command data sets may include a command CMD and a slot number SLTN. For example, the slot number SLTN may be a value represented by 0 to 4 bits of the command data set, and the command CMD may be a value represented by the remaining three bits of the command data set.

The slot number SLTN may be one of a plurality of predetermined slot numbers and may be determined by the first processor 140. The slot number SLTN may have a certain value.

The slot number SLTN may be, for example, an identifier corresponding to the command CMD. In an embodiment, when the second processor 150 receives the command data set, the second processor 150 may extract and execute the command CMD. For example, the second processor 150 may control the second function block 112 to execute a certain operation corresponding to the command CMD. The second processor 150 may transfer the slot number SLTN to the first processor 140 via, for example, the mailbox 160 along with completion information notifying that the command CMD execution has been completed. Depending on the completion information and the slot number SLTN, the first processor 140 may recognize that the command CMD execution has been completed. The first and second processors 140 and 150 may effectively perform all operations relating to the command CMD using the slot number SLTN.

Referring back to FIG. 2, the input/output unit 210 may receive abort slot numbers from the first processor 140. The input/output unit 210 may store the received abort slot numbers in the command management register CMR.

In an embodiment, the first processor 140 may provide the abort slot numbers in bitmap format. The first processor 140 may transfer an abort bitmap, including data bits respectively corresponding to the plurality of predetermined slot numbers, to the mailbox 240. The abort bitmap may be stored in the command management register CMR.

Referring to FIG. 4, the abort bitmap may be formed of a plurality of data bits B0 to B31. Each data bit may correspond to one slot number. For example, assuming the plurality of predetermined slot numbers are 0h to 31h, the number of the predetermined slot numbers is 32. The abort bit map may consist of 32 data bits B0 to B31, $0^{th}$ to $31^{st}$ data bits B0 to B31 may correspond to the slot numbers 0h to 31h, respectively. Each data bit may have a select value (e.g., logic value '1') or non-select value (e.g., logic value '0'). The abort slot numbers may be specified according to the data bits having the select values in the abort bitmap.

Referring back to FIG. 2, the control unit 230 may be coupled to the input/output unit 210, the register group 220, and the mailbox setting unit 240. The control unit 230 may be configured to control all operations of the mailbox 160.

The control unit 230 may be configured to search the command management register CMR, and search and abort the command data set having the slot number which is identical to (or corresponding to) the abort slot numbers from the command data sets CDS1 to CDS4 stored in the first command queue register CQ1.

When the abort slot numbers are stored in the command management register CMR as an abort bitmap, the control unit 230 may abort all or some of the command data sets stored in the first command queue register CQ1 based on the abort bitmap. For example, when the second data bit B2 of the abort bitmap has the select value, the control unit 230 may search a command data set having the slot number 2h and may remove the command data set.

In an embodiment, the first processor 140 may transfer a command lock signal to the mailbox 160 before transferring the abort bitmap. The control unit 230 may change the data bit stored in a lock register LCKR of the mailbox setting unit 240 in response to the command lock signal received from the first processor 140 via the input/output unit 210. The second processor 150 may be configured to access the register group 220 based on the search result after searching operations of the lock register LCKR is completed. When the data bit which is stored in the lock register LCKR is changed, the second processor 150 may not receive the command data set from the first command queue register CQ1.

In an embodiment, the control unit 230 may change the data bit which is changed in an abort state register ASR during an abort operation. When the data bit stored in the abort state register ASR is enabled, the processors 140 and 150 may access the register group 220.

In an embodiment, the first processor 140 may transfer the abort slot numbers to the mailbox 160 as a bitmap. The first processor 140 may transfer a plurality of abort slot numbers at once by transferring an abort bitmap to the mailbox 160 without a need to transfer information regarding each of the abort slot numbers to the mailbox 160 individually. Thus the speed of the abort operation may be enhanced.

For convenience of illustration, it will be assumed that the abort slot numbers are provided to the mailbox 160 as an abort bitmap.

Figure 5:
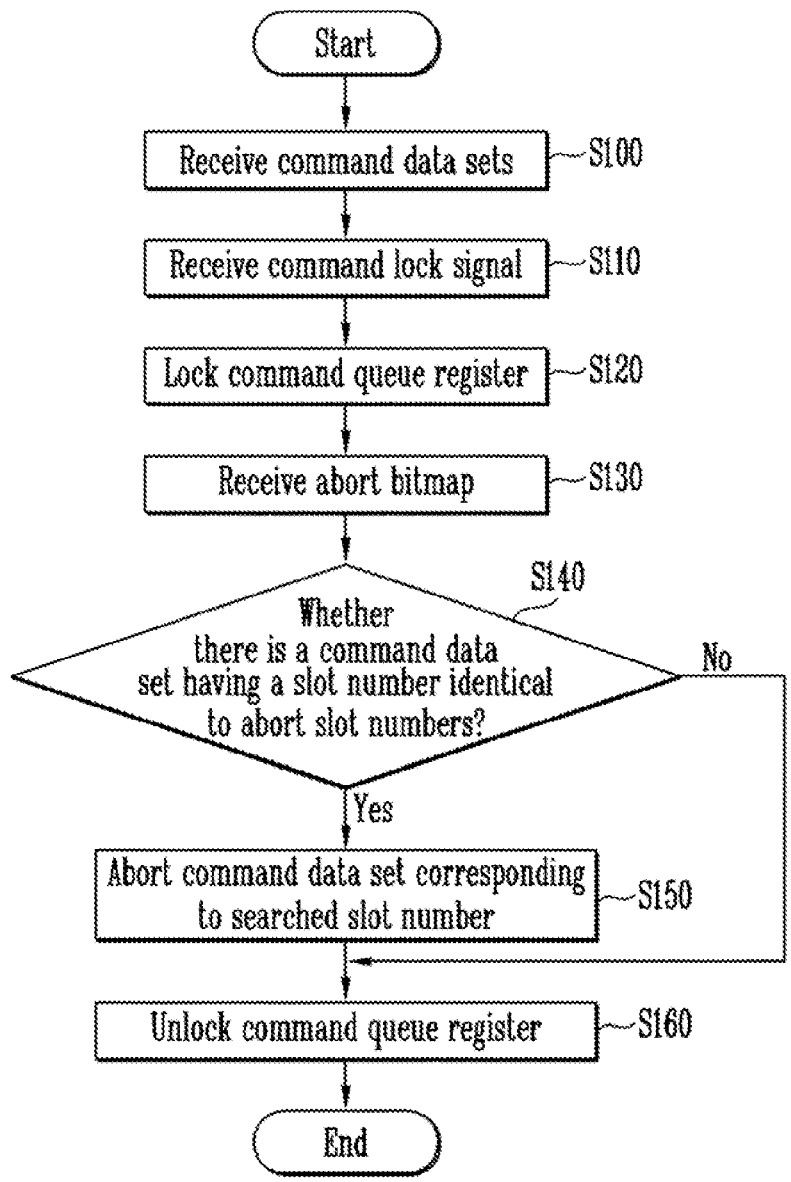
FIG. 5 is a flow chart illustrating a method for operating a mailbox according to an embodiment.

FIG. 5 is a flow chart illustrating a method for operating a mailbox 160 according to an embodiment.

Referring to FIGS. 1, 2 and 5, the mailbox 160 may receive command data sets from the first processor 140 (S100). The mailbox 160 may receive a command lock signal from the first processor 140 (S110). The mailbox 160 may lock the register group 220 in response to the command lock signal (S120). For example, the mailbox 160 may change a data bit of the lock register LCKR of the mailbox setting unit 240 to "1." The mailbox 160 may change a data bit of the abort state register (ASR) of the mailbox setting unit 240 to "1."

The mailbox 160 may receive an abort bitmap from the first processor 140 (S130). The first processor 140 may transfer an abort bitmap after a transfer of the command lock signal is completed. Abort slot numbers may be specified by the abort bitmap.

The mailbox 160 may determine whether there is a command data set having a slot number identical to the abort slot numbers among the command data sets stored in the command queue register CQ1. The mailbox 160 may compare the slot numbers in the command queue register CQ1 with the abort slot numbers. If the comparison shows that there is a slot number identical to the abort slot numbers in the command queue register CQ1, S150 may be performed. If not S160 may be performed.

When a slot number identical to the abort slot numbers is found in the command queue register CQ1, the mailbox 160 may abort the command data set corresponding to the abort slot number (S150). For example, the mailbox 160 may change the command data set to a default value.

The mailbox 160 may unlock the command queue register CQ1 (S160). For example, the mailbox 160 may initialize the data bit of the lock register LCKR of the mailbox setting unit 240 to "0." Also, the mailbox 160 may initialize the data bit of the ASR of the mailbox setting unit 240 to "0."

The second processor 150 may access the command queue register CQ1. The second processor 150 may receive command data sets remaining in the command queue register CQ1. For example, when the second processor 150 receives the default value, the second processor 150 may ignore the default value.

Figure 6:
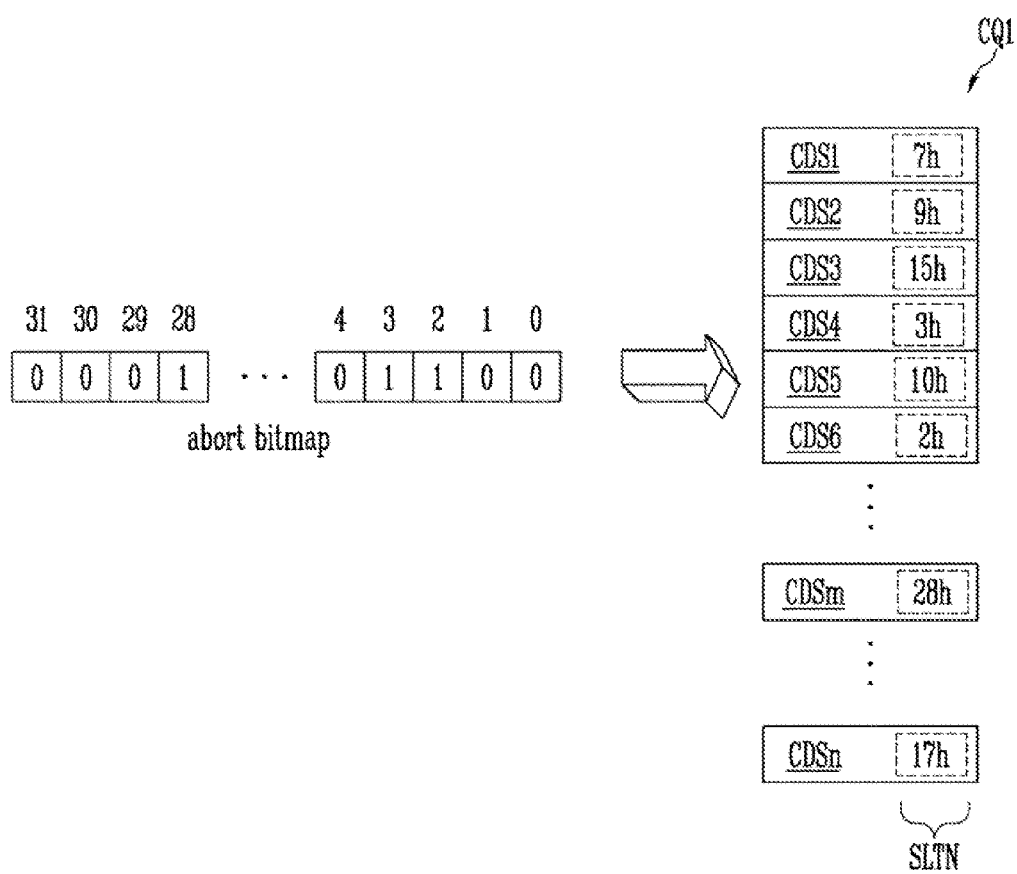
FIGS. 6 and 7 illustrate a process in which some command data sets stored in the mailbox are aborted.
Figure 7:
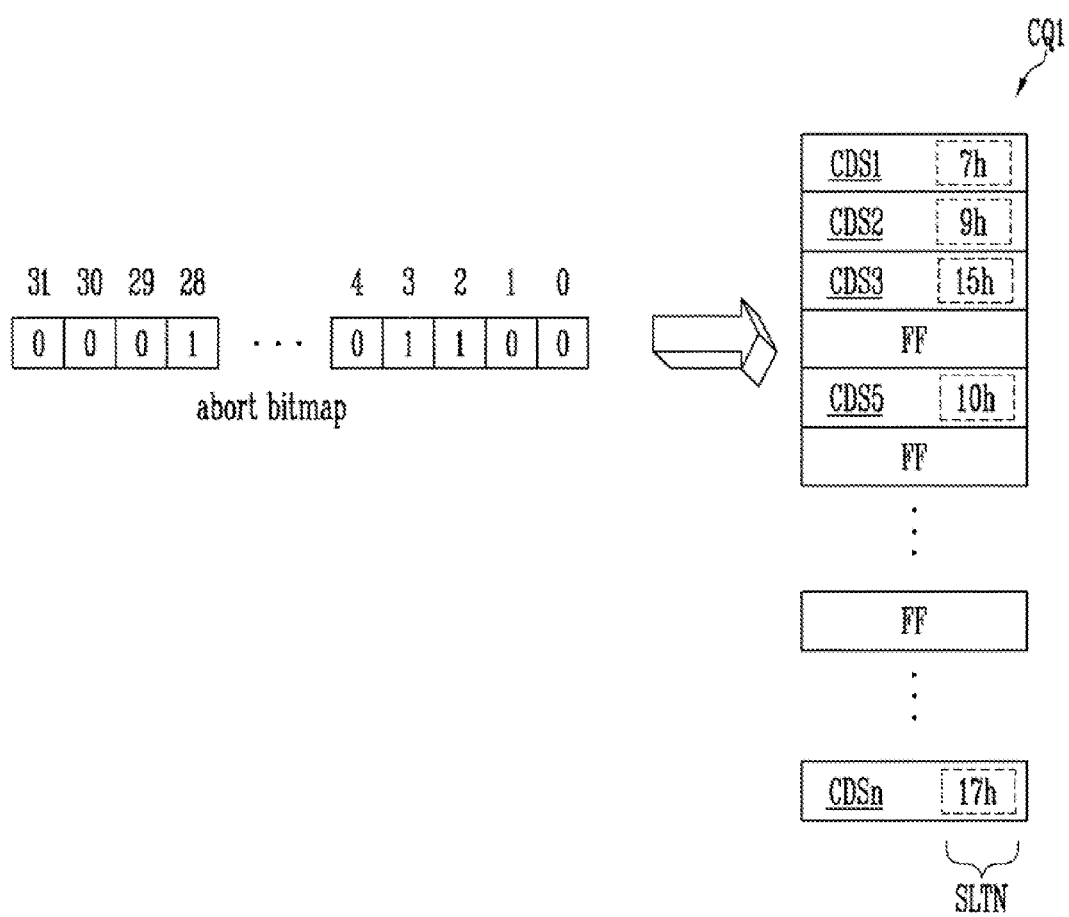

FIGS. 6 and 7 illustrate a process in which some of command data sets CDS1 to CDSn stored in a mailbox 160 are aborted.

Referring to FIG. 6, the mailbox 160 may receive an abort bitmap. The $2^{nd}$, $3^{rd}$ and $28^{th}$ data bits may have select values '1' in the abort bitmap. Remaining data bits may have non-select values '0'. 2h, 3h and 28h may be specified with abort slot numbers.

A plurality of abort slot numbers may be quickly provided to the mailbox 160 because data bits respectively corresponding to predetermined slot numbers may form the abort bitmap. Each of the data bits has the select value '1' or the non-select value "0".

The mailbox 160 may detect a slot number SLTN that is identical to the abort slot numbers in a command queue register CQ1.

The slot number 3h of a fourth command data set CDS4, the slot number 2h of a sixth command data set CDS6, and the slot number 28h of the $m^{th}$ command data set CDSm may be identified as having the abort slot numbers.

Referring to FIG. 7, the command data set having the abort slot numbers may be aborted. Each of the fourth command data set CDS4, the sixth command data set CDS6 and the mth command data set CDSm may be changed to a default value along with the corresponding slot number.

The second processor 150 (refer to FIG. 1) may access the command queue register CQ1 when the register group 220 is unlocked. The second processor 150 may receive command data sets remaining in the command queue register CQ1. The fourth command data set CDS4, the sixth command data set CDS6 and the mth command data set CDSm may have default values and therefore may not be executed by the second processor 150.

Figure 8:
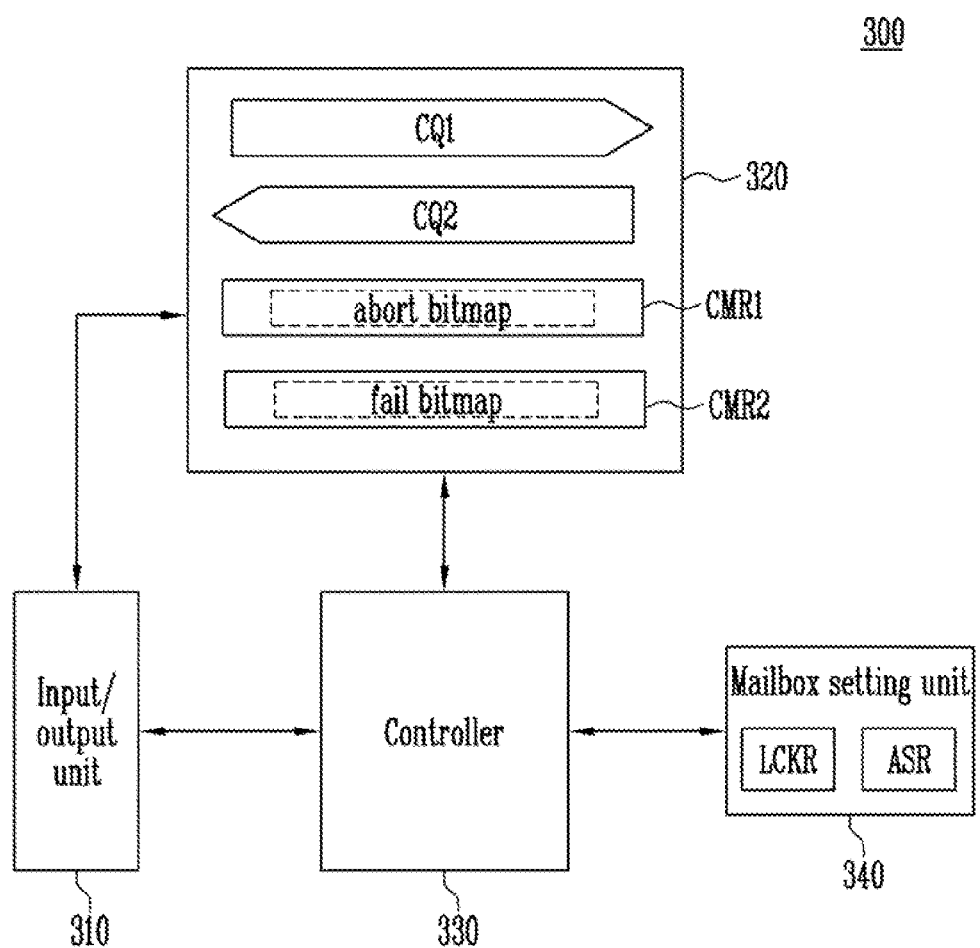
FIG. 8 is a block diagram illustrating a mailbox according to an embodiment.

FIG. 8 is a block diagram illustrating a mailbox 300 according to an embodiment.

Referring to FIG. 8, the mailbox 300 may have an input/output unit 310, a register group 320, a control unit 330 and a mailbox setting unit 340.

The register group 320 may include first and second command queue registers CQ1 and CQ2, a first command management register CMR1 and a second command management register CMR2.

The first command management register CMR1 may store an abort bitmap similar to the command management register CMR described in reference to FIG. 2. Hereinafter, repeated descriptions will be omitted.

The second command management register CMR2 may store a fail bitmap. The fail bitmap may be generated by the control unit 330 in a process in which some of command data sets CDS1 to CDSn are aborted according to the abort bitmap.

The second processor 150 (refer to FIG. 1) may receive the fail bitmap by searching the second command management register CMR2. According to the fail bitmap, the second processor 150 may abort all or some of the command data sets received before the abort operation.

Thus, even if the command data sets are transferred to the second processor 150 through the mailbox 300, the command data sets already transferred may be aborted. Therefore, reliability of the semiconductor device 100 may be improved.

Figure 9:
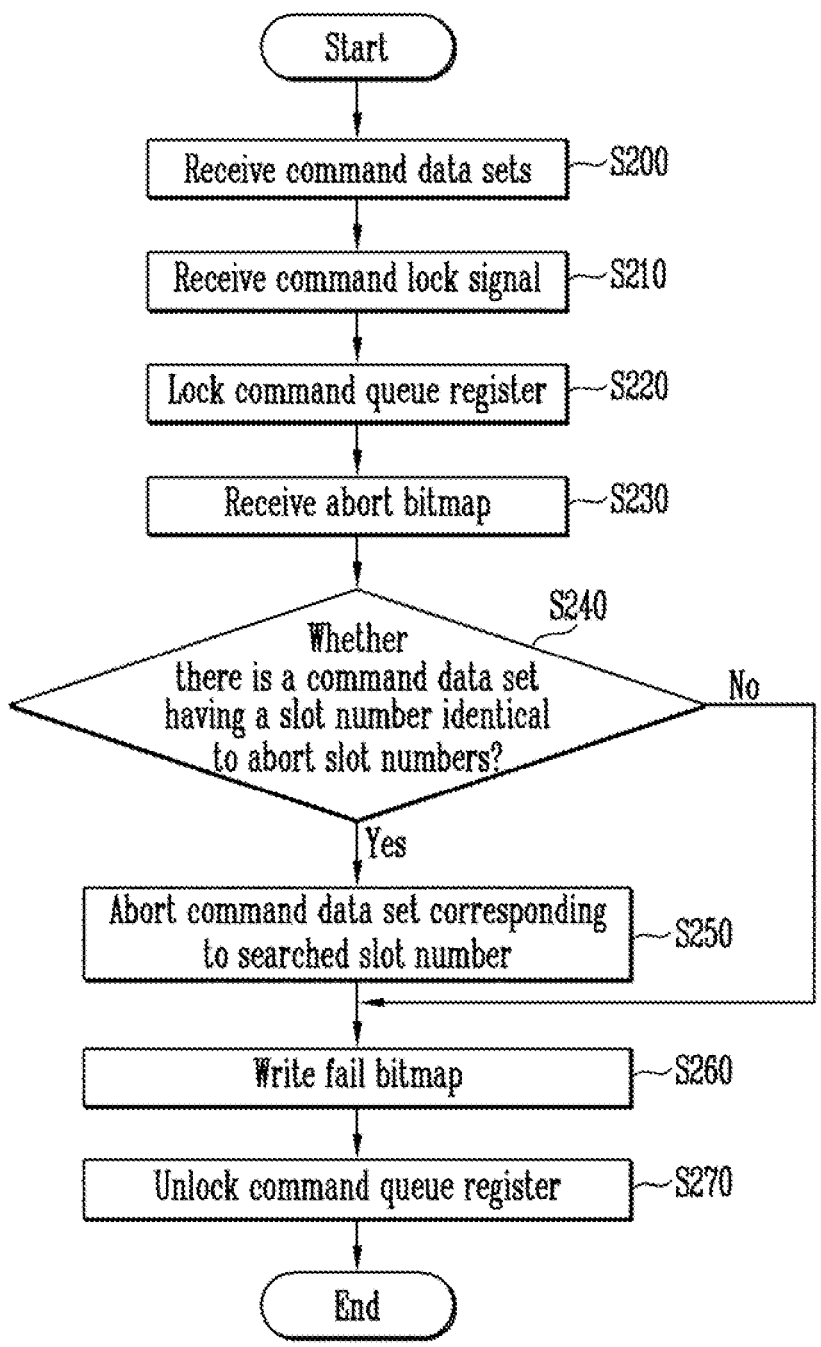
FIG. 9 is a flow chart illustrating a method for operating a mailbox according to an embodiment.

FIG. 9 is a flow chart illustrating a method for operating a mailbox 300 according to an embodiment.

The mailbox 300 may receive command data sets from the first processor 140 (S200). A command lock signal may be received from the first processor 140 (S210). The mailbox 300 may lock a command queue register CQ1 in response to the command lock signal (S220). For example, the mailbox 300 may change a data bit of a lock register LCKR of the mailbox setting unit 340 to "1."

The mailbox 300 may receive an abort bitmap from the first processor 140 (S230).

A determination may be made as to whether a command data set exists which has a slot number that is identical to abort slot numbers among the command data sets of the command queue register CQ1 (S240). If the command data set exists, S250 may be performed. Otherwise, S260 may be performed.

The mailbox 300 may abort the command data set corresponding to the abort slot number (S250).

The mailbox 300 may write a fail bitmap with respect to the abort slot numbers which are not searched in the command queue register CQ1 (S260).

Some of command data sets of the command queue register CQ1 may be output to the second processor 150 before the first processor 140 transfers the command lock signal. Thus, the abort slot numbers which are provided by the first processor 140 but not located in the command queue register CQ1 may be present. The mailbox 300 may store the abort slot numbers which are not found in the command queue register CQ1 (hereinafter fail slot numbers) in the second command management register CMR2.

In an embodiment, the fail slot numbers may be written as a bitmap. The mailbox 300 may generate a fail bitmap including data bits respectively corresponding to a plurality of predetermined slot numbers. Among the data bits, data bits corresponding to the fail slot numbers may have select values. Remaining data bits may have non-select values.

The mailbox 300 may unlock the command queue register CQ1 (S270). For example, the mailbox 300 may change the data bit of the lock register LCKR of the mailbox setting unit 240 to "0."

Figure 10:
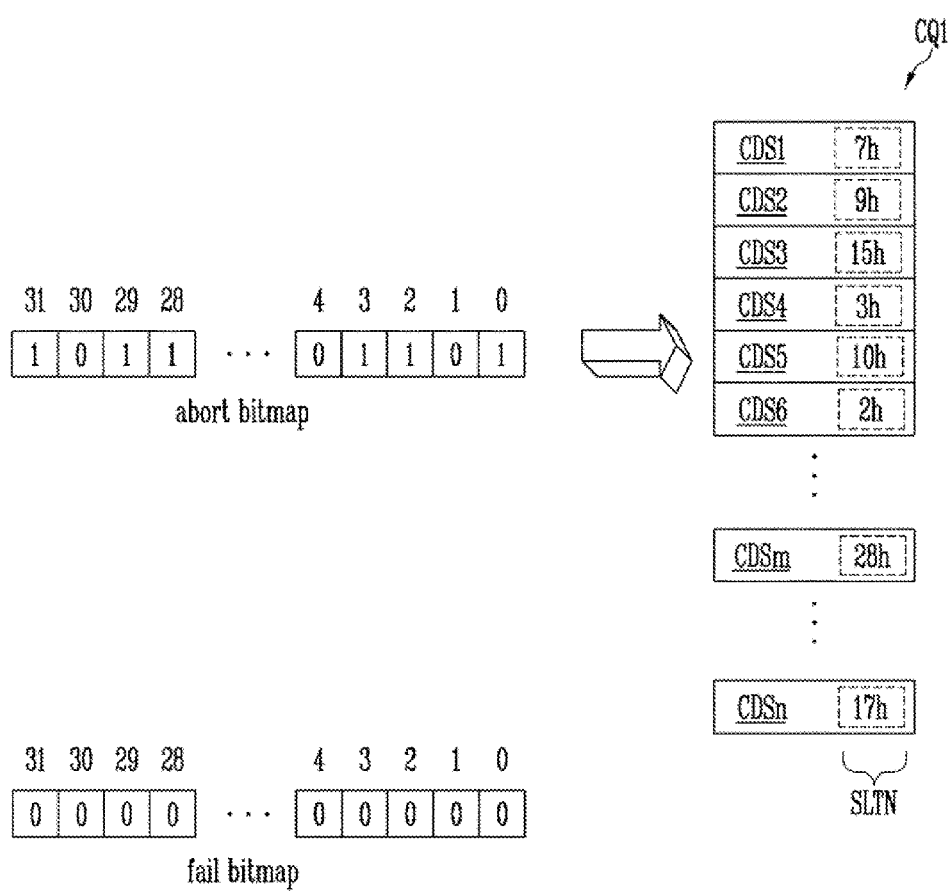
FIGS. 10 and 11 illustrate a process in which some command data sets stored in the mailbox are aborted.
Figure 11:
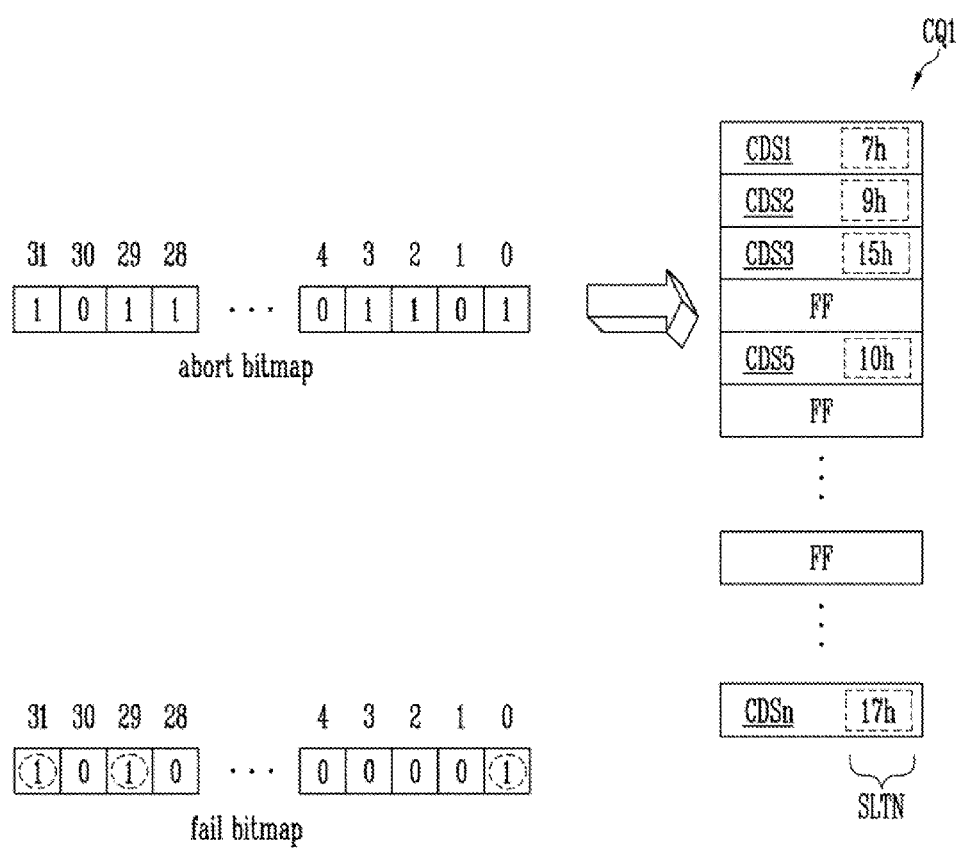

FIGS. 10 and 11 illustrate a process in which some of the command data sets CDS1 to CDSn stored in the mailbox 300 are aborted.

Referring to FIG. 10, the mailbox 300 may receive an abort bitmap. In the abort bitmap, $0^{th}$, second, third, $28^{th}$, $29^{th}$ and $31^{st}$ data bits may have select values. According to the abort bitmap, "0h," "2h," "3h," "28h," "29h" and "31h" may be specified by abort slot numbers.

The fail bitmap may include the same number of data bits as the abort bitmap (which is 32). The 32 data bits may correspond to the slot numbers "0h" to "31h," respectively. The data bits of the fail bitmap may be initialized with the non-select values.

The mailbox 300 may detect a slot number SLTN identical to the abort slot numbers among the command data sets CDS1 to CDSn in the command queue register CQ1. For example, the slot number "3h" of the fourth command data set CDS4, the slot number "2h" of the sixth command data set CDS6, and the slot number "28h" of the $m^{th}$ command data set CDSm may be determined identical to the abort slot numbers.

The command data set which has the slot number that is identical to the abort slot numbers may be aborted as shown in FIG. 11. The fourth command data set CDS4, the sixth command data set CDS6 and the mth command data set CDSm may respectively be changed to default values.

Meanwhile, "0h," 29h" and "31h" may be designated as the abort slot numbers but not found in the command queue register CQ1. Thus, these numbers are designated as fail slot numbers. A control unit 330 may change data bits corresponding to "0h," "29h" and "31h" of the fail bitmap to select values. This fail bitmap may be stored in the second command management register CMR2 (refer to FIG. 8).

FIG. 12 is a flow chart illustrating an operating method of a second processor 150.

Referring to FIGS. 1, 8 and 12, the second processor 150 may detect that the command queue register CQ1 is locked (S310). The second processor 150 may detect if the command queue register CQ1 is locked by searching the lock register LCKR of the mailbox 300.

The second processor 150 may stop executing the command data sets received from the command queue register CQ1 in response to the search result notifying that the command queue register CQ1 is locked.

In an embodiment, the second processor 150 may include an internal buffer. The command data sets received from the command queue register CQ1 may be temporarily stored in the internal buffer and the command data sets temporarily stored in the internal buffer may be sequentially executed. The second processor 150 may stop executing the command data sets stored in the internal buffer if it detects that the command queue register CQ1 is locked.

The second processor 150 may determine whether the command queue register CQ1 is unlocked (S330). If the command queue register CQ1 is unlocked, it may mean that the abort operation is completed. It may also mean that the second processor 150 may access the register group 320.

If the command queue register CQ1 is unlocked, S340 may be performed. Otherwise, S310 may be performed.

In an embodiment, the second processor 150 may monitor if the command queue register CQ1 is unlocked by searching periodically the lock register LCKR.

The second processor 150 may search a fail bitmap of the second command management register CMR2 (S340). The second processor 150 may determine whether the fail slot numbers represented by the fail bitmap exist among the command data sets already received.

For example, if the fail slot numbers represented by the fail bitmap as shown in FIG. 11 are "0h," "29h" and "31h," the second processor 150 may determine if the command data set including the slot numbers "0h," "29h" and "31h" are stored in the internal buffer.

If the fail slot numbers exist among the command data sets already received, S360 may be performed. Otherwise, S370 may be performed.

The second processor 150 may abort the command data set including the fail slot numbers (S360). The second processor 150 may execute remaining command data sets (S370). The second processor 150 may receive command data sets from the command queue register CQ1 and execute the received command data sets.

In an embodiment, the first processor 140 may abort specific command data sets, even after the specific command data sets are already transferred to the second processor 150 before the first processor 140 transfers the abort bitmap to the mailbox 300. Therefore, reliability of the semiconductor device 100 may be improved.

The specific terms used in the embodiments above are for purposes of illustration and should not be construed limitative.

What is claimed is:

1. A semiconductor device, comprising:
   a first function block group configured to receive requests from an external host and to transmit responses corresponding to the requests to the external host;
   a first processor configured to generate command data sets corresponding to the requests, respectively, each of the command data sets including a command and a slot number corresponding to the command,
   a mailbox configured to receive the command data sets from the first processor and to abort one or more of the command data sets according to control of the first processor;
   a second function block group configured to perform interfacing between a nonvolatile memory device and the semiconductor device according the command data sets; and
   a second processor configured to receive the command data sets from the mailbox and to control the second function block group to transmit the command data sets to the nonvolatile memory device,
   wherein the first processor transfers a command lock signal to the mailbox to block the mailbox from receiving the command data sets and an abort slot number,
   wherein the abort slot number is in bitmap format, and
   wherein the mailbox searches and aborts a command data set having a slot number identical to the abort slot number among the command data sets.

2. The semiconductor device of claim 1,
   wherein the slot number included in each of the command data sets is one of predetermined slot numbers.

3. The semiconductor device of claim 2, wherein the first processor transfers the abort slot number by providing an abort bitmap to the mailbox, and
   wherein the abort bitmap includes data bits respectively corresponding to the predetermined slot numbers.

4. The semiconductor device of claim 3,
   wherein the data bits include an abort data bit and a remaining data bits,
   wherein the abort data bit corresponds to the abort slot number,
   wherein the abort data bit has a select value, and
   wherein the remaining data bits have non-select values.

5. The semiconductor device of claim 4, wherein the mailbox searches and aborts a command data set having a slot number corresponding to a data bit having the select value among the data bits of the abort bitmap.

6. The semiconductor device of claim 5, wherein the mailbox allows an input to and an output from the command queue register upon completion of the search and aborting by the mailbox.

7. The semiconductor device of claim 1, wherein the mailbox comprises a command queue register,
wherein the command queue register stores the command data sets, and
wherein the mailbox blocks an input to and an output from the command queue register in response to the command lock signal.

8. The semiconductor device of claim 1, wherein the mailbox comprises a command queue register and a command management register,
wherein the command queue register stores the command data sets,
wherein the command management register stores a fail slot number, and
wherein the fail slot number is at least one abort slot number that does not found exist among the slot numbers of the command data sets stored in the command queue register.

9. The semiconductor device of claim 8, wherein the slot number included in each of the command data sets is one of predetermined slot numbers,
wherein the mailbox stores in the command management register a fail bitmap,
wherein the fail bit map includes data bits respectively corresponding to the predetermined slot numbers, and
wherein the fail slot number is specified according to the fail bitmap.

10. The semiconductor device of claim 9, wherein a data bit corresponding to the fail slot number among the data bits of the fail bitmap has a select value, and a remaining data bits have non-select values.

11. The semiconductor device of claim 8, wherein the second processor temporarily stores the command data sets received from the mailbox and determines whether the temporarily stored command data sets have slot numbers identical to the fail slot number by searching the command management register.

12. The semiconductor device of claim 11, wherein the second processor aborts a command data set having a slot number identical to the fail slot number among the temporarily stored command data sets.

13. A method for operating a semiconductor device including a plurality of processors, comprising:
receiving requests from an external host by a first processor:
storing in a mailbox command data sets corresponding to the requests, respectively, wherein the command data sets are generated by the first processor, wherein each of the command data sets includes a command and a slot number corresponding to the command;
aborting at least one command data set having the slot number identical to the abort slot number among the command and data sets stored in the mailbox; and
transferring the command data sets excluding the at least one command data set stored in from the mailbox to a second processor; and
transmitting the command data sets excluding the at least one command data set to an external nonvolatile memory device by the second processor;
wherein the slot number included in each of the command data sets is one of predetermined slot numbers, wherein the transferring of the abort slot number comprises providing an abort bitmap the mailbox to transfer the abort slot number, and
wherein the abort bitmap includes data bits respectively corresponding to the predetermined slot numbers.

14. The method of claim 13, further comprising:
storing in the mailbox a fail slot number which is at least one abort slot number that does not exist among the slot numbers of the command data sets in the command queue register; and
determining whether the slot numbers of the command data sets transferred from the mailbox are identical to the fail slot number by searching the fail slot number stored in the mailbox.

15. The method of claim 14, wherein a command data set having the slot number identical to the fail slot number among the command data sets transferred from the mailbox is aborted, and
wherein the second processor executes the command data sets excluding the aborted command data set.

* * * * *